Patented Dec. 10, 1935

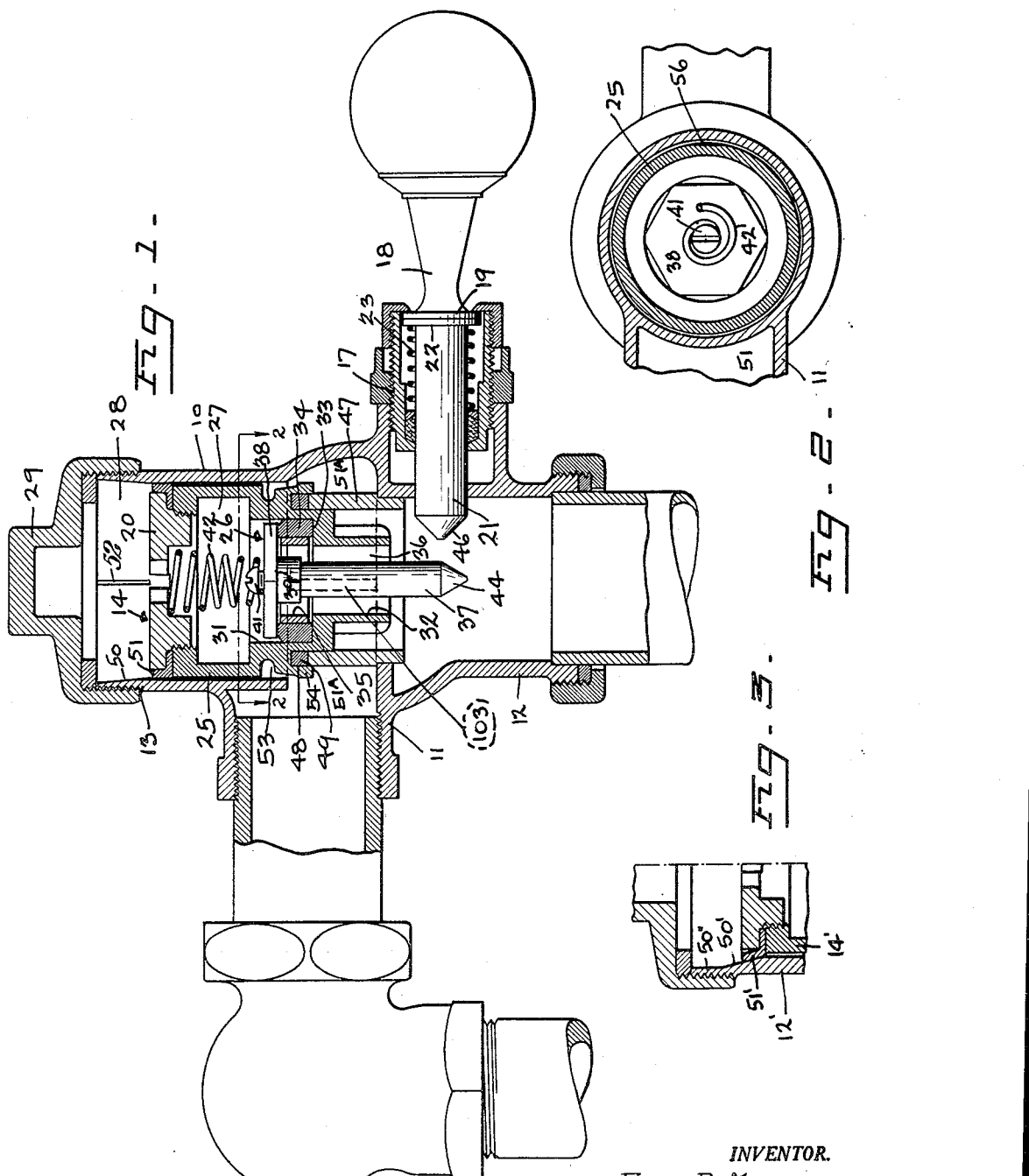

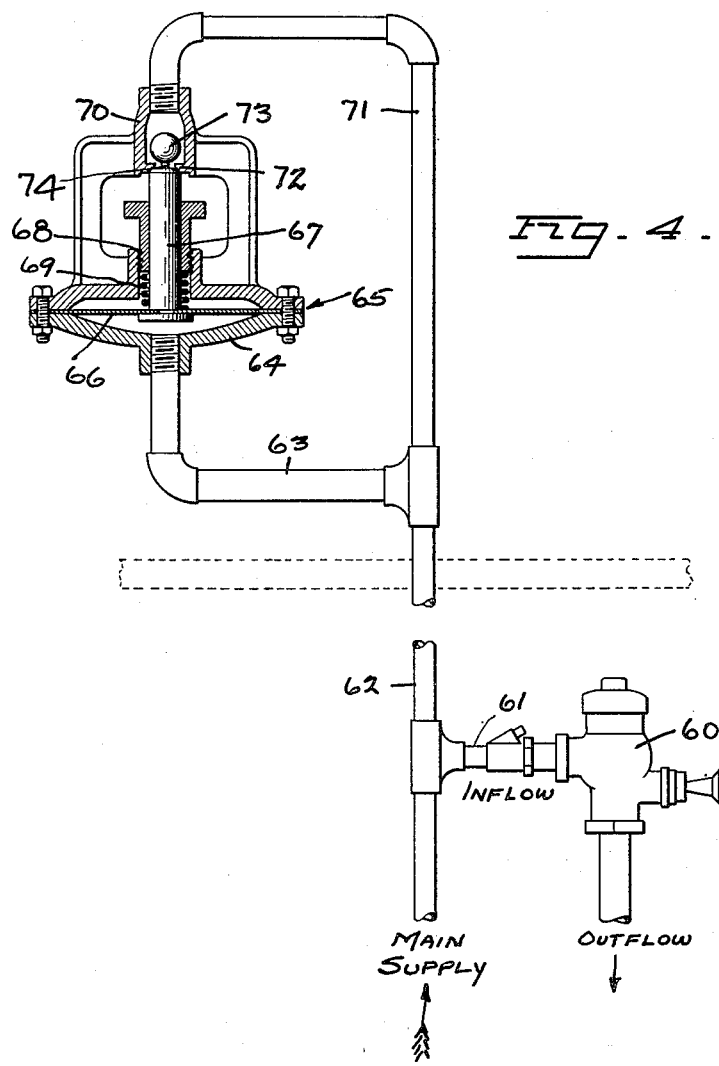

2,023,788

UNITED STATES PATENT OFFICE 2,023,788

NONSIPHONING FLUSH VALVE

Fred P. Miller, San Francisco, Calif.

Application November 30, 1932, Serial No. 644,964

2 Claims. (Cl. 137—93)

This invention relates generally to valves such as are commonly used upon water pipes for flushing closet bowls. It is of the fluid pressure type in which, after manual actuation of a lever or button, the valve is opened by fluid pressure and subsequently automatically closed.

It is a general object of the invention to devise a valve of the above character which will give satisfactory and continuous performance under adverse operating conditions, as for example the presence of sediment in the water.

It is a further object of the invention to devise a flush valve which is relatively simple in construction, which can be readily manufactured, and which will give satisfactory operation for a variety of line pressure.

It is a further object of the invention to devise a flush valve in which a piston is provided with a cup washer thereon, said cup washer being free from the walls of the valve as the piston moves yet providing a tight seal with a tapered portion of the valve when the piston is seated in the closed position.

It is a further object of the invention to devise a flush valve which will positively seal the inflow passage with respect to the fluid pressure chamber and the bowl to which the valve is connected, thereby obviating pollution of the water in the main line in the event that the water pressure falls below a given minimum value.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

My invention is an improvement of the device disclosed by my copending application Serial No. 513,287, filed Feb. 4, 1931, Patent No. 1,937,044, dated Nov. 28, 1933.

Referring to the drawings:

Figure 1 is a side elevational view in cross section, illustrating a flush valve incorporating the present invention.

Fig. 2 is a cross sectional detail taken along the line 2—2 of Fig. 1.

Fig. 3 is a cross section through a fragmentary portion of a valve casing having a modified form of cylinder wall therein and showing the engagement of the cup leather on the piston valve in relation thereto.

Fig. 4 is a side elevation partly in section, of a piping system having a flush valve constructed in accordance with my invention incorporated therein, and operating in conjunction with a vacuum or suction eliminating mechanism.

That modification of the invention illustrated in Figs. 1 and 2 of the drawings consists of a hollow valve casing 10, provided with a lateral inflow opening 11 and a downwardly extending outflow opening 12. Suitable inlet and discharge pipes can be connected to these openings as illustrated. In the upper part of casing 10 there is a cylinder 13 within which a piston 14 is disposed. As will be presently explained the lower portion of piston 14 forms a main valve member adapted to cooperate with a relatively stationary valve seat. To provide an actuator for manually initiating operation of the valve, there is shown a fitting 17 threaded into one side of the valve casing 10. Lever 18 extends into fitting 17 and is provided with an enlarged cam head 19. A slidable rod or plunger 21 is also carried by fitting 17 and is provided with an enlarged head 22 adapted to cooperate with head 19. Spring 23 normally retains plunger 21 in retracted position. As will be presently explained, a pilot valve member 26 is carried by piston 14, and is adapted to be engaged upon actuation of lever 18. Upon such actuation piston 14 moves upwardly by fluid pressure, thus permitting the flow of fluid thru the valve casing to the outflow opening 12. After a sufficient amount of fluid has been permitted to flow to effect a flushing operation, piston 14 is moved downwardly by fluid pressure to close the valve and to discontinue further flow.

The detailed construction of piston 14, with its associated parts which forms a piston assembly, is as follows: The piston body 25 as shown in Fig. 1 is preferably formed of a suitable metal, such as brass, which will not readily corrode. The upper side of the piston presents a cavity 27 to the space 28 above the piston. Space 28 is enclosed by cap 29 to form a fluid pressure chamber. As a part of the general piston structure, a cylindrical bore 31 is provided centrally within the body 25 of the piston. A circular sleeve 32 of reduced diameter depends from the lower end of tube 31, thus forming a relatively flat annular surface 33 at the upper end of sleeve 32. An annular washer like member 34 made of suitable material, such as resilient vulcanized rubber, is removably fitted within bore 31 and seated upon shoulder 33. The upper face of member 34 forms an annular seating surface for a pilot valve to be presently described. A metal reinforcing ring 35 is shown frictionally retained in member 34. It should be noted that member 34 is relatively thick compared to ordinary rubber gaskets, and therefore it will not warp or buckle even though not positively clamped in position.

The port or passageway 36 thru piston 14, formed by bore 31 and sleeve 32, forms a passageway for flow of fluid between the two sides of the piston. It is this port or passageway 36 which is controlled by the pilot valve member 26. Pilot valve member 26 consists of a stem 37 normally extending substantially centrally of port 36, and having a head 38 secured to its upper end. The lower surface 39 of head 38 cooperates with and is adapted to seat upon the annular surface formed upon the upper face of washer like member 34. The contour of head 38 is preferably noncircular, as for example hexagonal as shown in Fig. 2, to permit a flow of fluid, between the head and the inner periphery of tubular member 31, over the upper surface of washer like member 34, and thru passageway 36. A screw 41 can be utilized for attaching head 38 to stem 37, and in order to facilitate retaining the pilot valve member in proper position with respect to the piston during assembly of the valve, I preferably interpose a removable retaining spring 42 formed as a spiral or helix between screw 41 and the plug 20 in the upper end of the piston 14. Thus as shown in Fig. 1 retaining spring 42 is formed of a piece of spring wire bent in appropriate form and has its opposite ends respectively engaged in the slot provided in the head of screw 41 and against the under side of the plug 20. The lower end portion 44 of stem 37 is preferably conical shaped, and is adapted to be engaged by the inner conical shaped portion 46 of plunger 21.

As has been previously mentioned, piston 14 by its movement controls flow of fluid thru the casing 10. Thus positioned within the valve casing and concentric with respect to piston 14, there is a seat ring 47 made of some suitable non-corrodable metal such as brass, which has a forced fit within the casing to enable its removal for replacement. An annular recess 48 is formed about bore 31 in the lower end of piston 14. Retained within recess 48 there is an annular seating washer 49 which is made of suitable material such as resilient vulcanized rubber. The lower annular surface of washer 49 is adapted to cooperate with the annular seating surface upon the upper annular end of ring 47. It will be noted that ring 47 extends upwardly in front of inflow opening 11, and that the body is formed to provide a pocket 51A surrounding ring 47 in communication with inflow opening 11. Therefore when the piston 14 is in a raised position to permit flow of water over ring 47 and down thru the interior thereof to the outflow opening 12, the water is diverted upwardly and then caused to flow downwardly. Thus in flowing thru the casing the water is caused to impact against the lower end faces of the piston, thus causing a portion of its kinetic energy to tend to lift the piston. This is an advantageous feature of my valve as will be presently explained.

The piston illustrated in Fig. 1 is of the loose fitting type in which restricted communication is provided between the inflow side of the valve and pressure chamber 28, thru the clearance between the piston and the inner walls of cylinder 13. In operating my valve with unclear water, that is water containing a substantial amount of sediment, foreign particles may lodge between the piston and the adjacent cylinder walls and render action of the valve sluggish. To prevent the foreign particles from finding their way between the cooperating surfaces between the piston and the cylinder, a settling pocket 53 is formed in the peripheral portion of the piston, preferably adjacent the lower portion of the piston as shown in Fig. 1. The lower side of pocket 53 is defined by annular ridge 54, which is of substantially the same diameter as the diameter of the remainder of the piston. As shown in Fig. 2 ridge 54 is flattened as indicated at 56, to provide a port for relatively free fluid communication between the space below the piston and pocket 53. When piston 14 is in its lowermost position as shown in Fig. 1, ridge 54 is below the lower end of cylinder 13, and therefore any foreign particles which may have found their way into pocket 53 are free to settle out into the valve casing. During cyclic movements of piston 14 as will be presently described, there is an upward flow of fluid from the inflow side of the valve thru the clearance or space between the piston and the cooperating walls of cylinder 13. This upward flow must traverse pocket 53, and since this pocket provides a space of considerable area compared to the clearance between the piston and the cylinder, the fluid within this space is maintained in a condition of comparative quiescence, so that foreign particles in the fluid tend to remain in this pocket, and do not tend to continue upwardly with the fluid between the piston and cylinder.

In operating the valve shown in Fig. 1, assuming that water under pressure is applied to inflow opening 11, and that the valve is closed, an operator forces lever 18 to one side thus projecting plunger 21 to displace pilot valve stem 37 laterally. One side of head 38 is thus lifted from its seat, and water under pressure trapped in chamber 28 is exhausted into the outflow opening 12. The water pressure upon the inflow side of the valve thereupon forces piston 14 upwardly to permit water to flow over and down thru the ring 47. As has been previously explained, during flow of water thru the casing the water is deflected upwardly assisted by the webs 103, against the lower side of the piston, thus expending considerable kinetic energy tending to continue upward movement of the piston to the limit of its travel and tending to prolong the time required for a complete cycle of operation. By the time the piston has moved to the upper limit of its travel, the pilot valve member 26 has become closed, and flow of water into chamber 28 occurs from the inflow side of the valve, thru the clearance provided between the piston and the cooperating walls of cylinder 13. The piston is thus displaced downwardly until the seating of washer 49 upon ring 47 closes the valve.

By virtue of the fact that the water in flowing thru the valve is deflected upwardly so that its kinetic energy tends to move the piston upwardly, it is possible to use a greater clearance between the piston and the adjacent cylinder walls, without having the action too rapid. It is obvious that a greater clearance precludes jamming of the piston thru accumulation of sediment and permits practical manufacture with a greater range of permissible tolerances.

The interior periphery of the wall of the cylinder 12 above the piston valve 14, is tapered at 50 to permit relatively free upward and downward movement of the said piston valve. The tapered portion 50 insures a tight seating or sealing effect between the cup washer 51 around the upper end of the piston and the cylinder wall, to prevent leakage and to hold the pressure on the fluid confined above the piston when the pressure drops on the inflow side. The plug 20 is threaded into engagement with the upper end of the piston, and said plug 20 also engages the lateral flanged portions of the cup washer 51 to hold said cup washer in place, that it may engage the walls of the cylinder.

I have provided a vertically disposed groove 52 of slight depth, on the tapered portion 50 of the cylinder, which groove 52 permits water below the upper end of the piston valve to escape into the area above the said piston valve during the periods when the piston valve is dropping from the opened into the closed position. The groove 52 prevents water from being trapped below the upper side of the piston valve and interfering with an efficient closing of the piston valve on its seat. The groove 52 permits by-passing of fluid should the cup leather on the piston tend to hug or stick to the cylinder walls.

It will be noted that the tapered portion of the cylinder as shown in Fig. 1, extends from a point substantially opposite the cup leather on the piston valve (when the latter is seated) to the upper end of the cylinder within the fluid pressure chamber. With this construction some little resistance is encountered by the cup leather as it drops past the tapered portion of the cylinder into contact with the non-tapered portion thereof. This friction may, in some instances, prove objectionable, and in order to avoid anything which might savor of a mechanical defect in the apparatus, I have illustrated in Fig. 3 a modified method of constructing the cylinder wall.

In Fig. 3 I have shown a cylinder 12', the upper end of which, within the area defined by the fluid pressure chamber, is of a greater diameter than the lower portion of said cylinder. I have found it particularly desirable to make the enlarged upper portion of the cylinder with a tapered seat 50'. The root of the taper starts at a point directly opposite the position of rest of the cup washer 51' when the piston valve 14' is seated on the valve seat around the outflow opening. The tapered portion 50' extends upwardly toward the upper end of the cylinder for a portion of the length thereof, merging into a substantially uniform diameter of cylinder wall as indicated at 50''. The vertical flange of the cup washer 51' has a normal tendency to flare outwardly and to engage the seat provided by the tapered portion 50' of the cylinder wall. When the piston valve 14' is moved vertically in either direction, the cup washer 51' does not contact the tapered bore of the cylinder. The cup washer 51' only engages the bore of the cylinder 50' when the said piston valve is in the closed position.

The form of construction shown in Fig. 3 permits of the inflow of fluid past the cup washer and into the pressure chamber above the piston valve, yet prevents a loss of fluid under pressure from the pressure chamber in a direction of flow downwardly toward the inflow opening. If the cup washer 51' should be made of very flexible leather, it will tend to contact the tapered bore of the cylinder wall very lightly and not to an extent which would add any appreciable degree of friction to the piston valve as it drops into the closed position or moves into the open position.

The cup leather on the upper side of the piston prevents water siphoning back into the inflow pipe in the event the water pressure is shut off or drops below atmospheric. If the water pressure upon the inflow pipe connections is shut off or reduced to atmospheric or below, water cannot be sucked past the cup washer into the inflow pipe connections from the pressure chamber, nor can air or fluid be sucked into the inflow pipe connections from the fixture with which the valve is connected. A vacuum on the inflow pipe would merely suck out the water lodged between the piston and cylinder, and would pull the cup washer into tight contact with the cylinder walls, thereby preventing any leakage or loss of the fluid contained in the pressure chamber. The cup leather holds the pressure in the pressure chamber against the piston to hold the piston closed, and to prevent siphoning of water past the piston.

The flush valve heretofore described is used in connection with fixtures wherein there is a direct passage of water from the supply line to the fixture for a predetermined period of time. In such fixtures, a volume of water is allowed to remain after the flush, which water may be siphoned back through the fixture into the supply line should a vacuum or suction condition occur in the supply line. It is possible that a vacuum might develop in the supply line, during a period when the flush valve may be in the process of flushing a fixture, or may for some other reason get out of order, which would tend to siphon the water supply from the fixture backwardly through the flush valve, and in order to prevent this, I have provided an apparatus on the roof of a building connected to the supply line which will automatically tend to break and destroy any vacuum or suction and to thereby render the entire system non-siphoning. In order to accomplish this I have shown my flanged valve generally designated by the numeral 60, connected by an inflow pipe 61 to a fluid supply line 62. The fluid supply line 62 is connected by a pipe 63 to the under side 64 of the diaphragm chamber 65. The diaphragm chamber 65 consists of a pair of dished members bolted together around the outer circumference thereof and having a diaphragm 66 confined therein and dividing the inside area of the dished members into separate chambers. A stem 67 is attached centrally on the upper side of the diaphragm 66 and projects outwardly through a spring adjusting bearing 68 on the upper half of the diaphragm chamber. An expansion spring 69 is interposed between the under side of the spring adjusting bearing 68 and the upper face of the diaphragm 66 to exert a downward pressure on the diaphragm. The upper side of the diaphragm chamber 65, in axial alignment with the stem 67, is provided with a ball valve housing 70, the upper end of said ball valve housing being connected to a conduit 71 which in turn is connected to the supply pipe 62. A valve seat 72 is provided in the under side of the ball valve casing 70, to receive the upper end of the diaphragm stem 67. A ball 73 is provided within the casing 70 to check the outward flow of fluid through the valve casing 70 in the event the diaphragm stem 67 should uncover the opening on the under side of said casing. The diaphragm stem 67 is provided with a protuberance 74 on the extreme end thereof, which protuberance 74 is adapted to extend partly within the valve casing 70 and to raise the ball 73 into an unseated condition. If it be assumed that the water pressure in the supply pipe on opposite ends of the diaphragm stem 67 is the same, then by virtue of the greater area of the diaphragm 66 exposed to the said pressure, it will be obvious that the upper end of the diaphragm stem 67 will be held tightly against the seat in the valve casing 70, and the spring 69 will be forced into compressed condition. In the event the pressure in the supply line 62 should drop so that there would be no pressure on either end of the diaphragm stem 67, then the spring 69 would tend to force the diaphragm stem 67 downwardly and to uncover the port in the valve casing, and to thereafter allow the ball 73 to seat itself over the uncovered opening. As a vacuum would tend to develop in the supply line, this vacuum would be broken by atmospheric air being sucked into the supply line past the ball 73. The apparatus heretofore described thus permits atmospheric conditions to prevail in the supply line, and thereby destroys any vacuum or suction which would tend to siphon any fluid past the flush valve 60.

Upon return of pressure to the supply line, the diaphragm stem would automatically be returned to the closed position in readiness for further operation should any further vacuum develop in the supply line. The device illustrated in Fig. 4 functions as a check valve for breaking any vacuum in the supply line by allowing the displacement in the supply line to become filled with atmospheric air. I have found a vacuum eliminating device such as described, to be desirable in some instances for use in connection with my flush valve.

My vacuum breaking device is so designed that it will not be affected by corrosion, sediment, or sticking thru long periods of inactivity, as contrasted with the conventional types of check valve.

Having thus described this invention, what I claim and desire to secure by Letters Patent is:

1. In a fluid operated valve, a hollow casing having inflow and outflow openings, a cylinder formed within the casing, a free floating piston fitted within the cylinder, the space on one side of the piston forming a fluid pressure chamber, and said portion of the cylinder in the pressure chamber being of a larger diameter than the lower portion of the cylinder, a main valve seat formed within the casing, a valve member cooperating with the seat and connected to the piston, said piston having a peripheral surface interrupted by an annular settling pocket for sediment in the inflowing fluid, the lower side of said pocket being defined by an annular ridge of substantially the same diameter as the diameter of the remainder of the piston, a portion of said ridge being flattened to provide a port for relatively free fluid communication between the space below said piston and said pocket, and a cup leather on the upper side of the piston engaging the walls of the cylinder to permit the restricted inflow of fluid into the chamber, and to prevent the exhausting of fluid from said chamber back to the inflow opening when the main valve member is closed.

2. In a fluid operated valve, a hollow casing having inflow and outflow openings, a cylinder formed within the casing, a free floating piston fitted within the cylinder, the space on one side of the piston forming a fluid pressure chamber, and the lower portion of the cylinder in the pressure chamber having a tapered seat therein, a main valve seat formed within the casing, a valve member cooperating with the seat and connected to the piston, said piston having a peripheral surface interrupted by an annular settling pocket for sediment in the inflowing fluid, the lower side of said pocket being defined by an annular ridge of substantially the same diameter as the diameter of the remainder of the piston, a portion of said ridge being flattened to provide a port for relatively free fluid communication between the space below said piston and said pocket and a cup leather on the upper side of the piston engaging the walls of the cylinder to permit the restricted inflow of fluid into the chamber, and to engage the tapered seat when the main valve is closed.

FRED P. MILLER.